(12) United States Patent
Miyazaki et al.

(10) Patent No.: US 8,146,724 B2
(45) Date of Patent: Apr. 3, 2012

(54) VEHICLE CLUTCH

(75) Inventors: Jun Miyazaki, Wako (JP); Hideo Senmyo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 529 days.

(21) Appl. No.: 12/393,399

(22) Filed: Feb. 26, 2009

(65) Prior Publication Data

US 2009/0242349 A1  Oct. 1, 2009

(30) Foreign Application Priority Data

Mar. 28, 2008  (JP) ................. 2008-086859

(51) Int. Cl.
*F16D 7/00* (2006.01)
*F16D 23/00* (2006.01)
*F16D 43/20* (2006.01)
*F16D 13/42* (2006.01)
*F16D 13/50* (2006.01)

(52) U.S. Cl. .............. 192/54.5; 192/70.23; 192/70.27

(58) Field of Classification Search ............. 192/54.5, 192/70.23, 70.27, 89.26
See application file for complete search history.

(56) References Cited

U.S. PATENT DOCUMENTS

| 2,351,996 | A   | * | 6/1944 | Morgan ................. 192/54.5 |
| 2,799,375 | A   |   | 7/1957 | Forster |
| 7,191,882 | B2  | * | 3/2007 | Kataoka et al. ............. 192/54.5 |
| 7,370,743 | B2  | * | 5/2008 | Kataoka et al. ............. 192/70.23 |
| 7,681,705 | B2  | * | 3/2010 | Okada et al. ............... 192/54.5 |
| 2007/0221465 | A1 |   | 9/2007 | Okada et al. |
| 2008/0029332 | A1 | * | 2/2008 | Gokan et al. ................. 180/383 |

FOREIGN PATENT DOCUMENTS

| DE | 19536424 A1 | 4/1996 |
| JP | 61-96222 A  | 5/1986 |
| JP | 2005-308092 A | 11/2005 |
| JP | 2005-325993 A | 11/2005 |

OTHER PUBLICATIONS

European Search Report dated May 19, 2010, issued in corresponding European Patent Application No. 09153084.

* cited by examiner

*Primary Examiner* — Roger L Pang
*Assistant Examiner* — Michael Gonzalez
(74) *Attorney, Agent, or Firm* — Westerman, Hattori, Daniels & Adrian, LLP (57) ABSTRACT

A vehicle clutch includes a clutch outer member, a clutch inner member, and a clutch center member movable in an axial direction between a first position and a second position. A cam mechanism is provided between the clutch inner and outer members. The cam mechanism generates an axial pulling force for moving the clutch center member to the first position when positive torque acts on the clutch inner member from the clutch center member.

4 Claims, 8 Drawing Sheets

VEHICLE CLUTCH

TECHNICAL FIELD

The present invention relates to a vehicle clutch mainly applicable to a motorcycle, and particularly relates to improvement of a clutch so as to increase clutch capacity at the time of transmission of positive torque.

BACKGROUND OF THE INVENTION

A clutch for use on a motorcycle is known. Japanese Patent Publication Laid-open No. 2005-325993, for example discloses a vehicle clutch that includes a clutch outer connected to an input member, a clutch inner that is coupled to an output member and arranged so as to be relatively rotatable within the clutch outer, a first friction plate spline-engaged to the clutch outer so as to be slidable in an axial direction, a second friction plate overlaid with the first friction plate spline-engaged with the clutch inner so as to be slidable, a pressed plate provided integrally at the clutch inner so as to face one side of the first and second friction plates, a pressing plate arranged facing the pressed plate sandwiched between the first and second friction plates so as to be capable of moving in an axial direction, a clutch spring urging the pressing plate towards the pressed plate, and clutch actuating members that resists urging force of the clutch spring so as to move the pressing plate to the opposite side to the pressed plate. In this example, thrust that pushes the pressing plate towards the pressed plate is then generated between the clutch inner and the pressing plate when positive torque acts from the pressing plate to the clutch inner.

The spring-load of the clutch spring of the clutch described above is lowered and a clutch disengaging operation load is reduced, which increases the clutch capacity during transmission of positive torque. However, when this clutch is operated in a half-clutch state, it is difficult to perform delicate operations due to an axial pulling force and friction force being generated by the cam mechanism as the amount of positive torque transmitted increases are applied to the pressing plate.

One object of the present invention to provide a vehicle clutch that is capable of a delicate half-clutch operation but also retains the above benefits.

SUMMARY OF THE INVENTION

The disclosed embodiments of the present invention have been developed in view of the above-mentioned and/or other problems in the related art.

According to one aspect of the present invention, a vehicle clutch is provided with a clutch outer engaged with an input member and a clutch inner provided in the clutch outer to be rotatable in relation thereto and the clutch inner is engaged with an output member. Also provided is a clutch center arranged so as to be movable in an axial direction at the clutch inner, a first friction plate spline-engaged with the clutch outer so as to be capable of sliding in an axial direction, a second friction plate overlaid on the first friction plate and spline-engaged so as to be slidable with the clutch center, a pressed plate provided in a coupled manner at the clutch inner so as to face one side surface of the first and second friction plates, a pressing plate arranged facing the pressed plate so as to sandwich the first and second friction plates, facing the pressed plate, and movable in an axial direction, clutch springs urging the pressing plate to the side of the pressed plate, and clutch actuating members that resist the urging force of the clutch springs and cause the pressing plate to move to the opposite side to the pressed plate. The clutch center is arranged to be movable between a first position, where the clutch center is spaced from the pressing plate and is in contact to the clutch inner, and a second position, where the clutch center pushes the pressing plate to move to the side opposing to the pressed plate. The clutch center is applied with spring loads of auxiliary springs towards the side of the second position, the spring loads being smaller than the spring loads of the clutch springs. Also, between the clutch inner and the clutch center, a cam mechanism is provided that generates an axial pulling force for moving the clutch center to the first position when positive torque acts on the clutch inner from the clutch center.

The input member and the output member described above correspond to an input shaft 1 and an output shaft 2 in an embodiment of the present invention described below, and the clutch actuating members correspond to the release plunger 22 and a release rod 23.

According to this aspect of the present invention, the pressing plate is subjected to a spring load of the clutch springs urging to the pressed plate side, i.e. in a direction of engaging the clutch, and a spring load of auxiliary springs urging to the opposite side to the pressed plate, i.e. in a direction of disengaging the clutch. However, the spring load of the auxiliary springs is set to be smaller than the spring load of the clutch springs. The pressing plate is therefore urged in the direction of engaging the clutch by a load that is the difference of the spring loads. This means that it is sufficient to only supply a pressing force to overcome the spring load difference that is smaller than the spring load of the clutch spring in order to press the pressing plate in a direction of disengaging the clutch in order to disengage the clutch. The action of disengaging the clutch can therefore be made lighter.

When half-clutch control of the clutch is carried out, a pulling force is generated at the cam mechanism that pulls the clutch center to the side of the clutch inner. The clutch center therefore resists the spring load of the auxiliary springs so as to be distanced from the pressing plate. As a result, the spring load of the auxiliary springs no longer acts on the pressing plate but rather only the spring loads of the clutch springs act on the pressing plate and the clutch lever. Friction accompanying the pulling force of the cam mechanism and the action of the cam mechanism therefore does not act on the pressing plate. Slight half-clutch control such as with typical clutches of the related art is therefore straightforward.

When the load is increased when the vehicle is running under a normal load, a pulling force that pulls the clutch center to the side of the clutch inner is generated by the cam mechanism as the result of the same action as at the time of a half-clutch operation. The spring load of the auxiliary springs therefore no longer acts on the pressing plate and the pressing plate is only subjected to the action of the spring load of the clutch springs. The spring load the pressing plate then incurs in the direction of engaging the clutch therefore increases by the proportion of the spring load of the auxiliary springs that no longer acts on the pressing plate. The clutch capacity therefore increases and the clutch can be made capable of transmitting a high torque.

Further, in another aspect of the present invention, the cam mechanism generates a pushing thrust that causes the clutch center to move to the second position when a reverse torque acts from the clutch inner to the clutch center.

According to this aspect of the present invention, when reverse torque exceeds a prescribed value during engine braking, a fishing rest that pushes the clutch center to the side of the pressing plate is generated at the cam mechanism. The spring force of the clutch springs acting on the pressing plate is therefore alleviated and the clutch capacity is reduced. Appropriate sliding therefore occurs between the first and second friction plates, and transmission of reverse torque greater than a prescribed value from the output side to the input side is suppressed.

In another aspect of the present invention, in addition to the first and second aspects, a plurality of bosses that support shafts that pass through the pressing plate in an axial direction are formed spaced equidistantly in a circumferential direction at a side surface of the clutch inner. Also, clutch springs are provided compressed between the ends of each support shaft and the pressing plate. The cam mechanism is constituted by a plurality of first cams formed spaced equidistantly in the circumferential direction at the clutch center and a plurality of second cams formed at the clutch inner so as to engage with the first cams. The second cams are provided in a coupled manner on the outsides of the bosses in a radial direction.

According to this aspect of the present invention, the second cams and the bosses mutually reinforce each other. A clutch inner that is both strong and lightweight can therefore be obtained.

Moreover, in another aspect of the present invention, the clutch center is constituted by a cylindrical portion to which the second friction plates are slidably spline-engaged, a hub supported at a hub of the clutch inner so as to be freely rotatable and slidable, and a plurality of spokes integratedly coupling the hub to the cylindrical portion, cylindrical spring accommodating tubes with bottoms, and with openings facing the clutch inner, are formed at sections coupling the cylindrical portion and the spokes, auxiliary springs exhibiting a spring forth in a separation direction are housed in the spring accommodating tubes between the bottom walls and the clutch inner, the cam mechanism is constituted by a plurality of first cams formed spaced equidistantly in the circumferential direction at the clutch center and a plurality of second cams formed at the clutch inner so as to engage with the first cams, and the first cams are installed at both sides of the spring accommodating tubes along the direction of rotation of the clutch center.

According to this aspect of the present invention, the cylindrical portions, the spring accommodating tubes, the first cams, the spokes, and the hubs mutually reinforce each other so that a strong, lightweight clutch center can be acquired.

BRIEF DESCRIPTION OF THE DRAWINGS

The preferred embodiments of the present invention are shown by way of example, and not limitation, in the accompanying figures, in which.

DETAILED DESCRIPTION OF THE INVENTION

In the following paragraphs, some embodiments of the invention will be described by way of example and not limitation. It should be understood based on this disclosure that various other modifications can be made by those in the art based on these illustrated embodiments.

Figure 1:
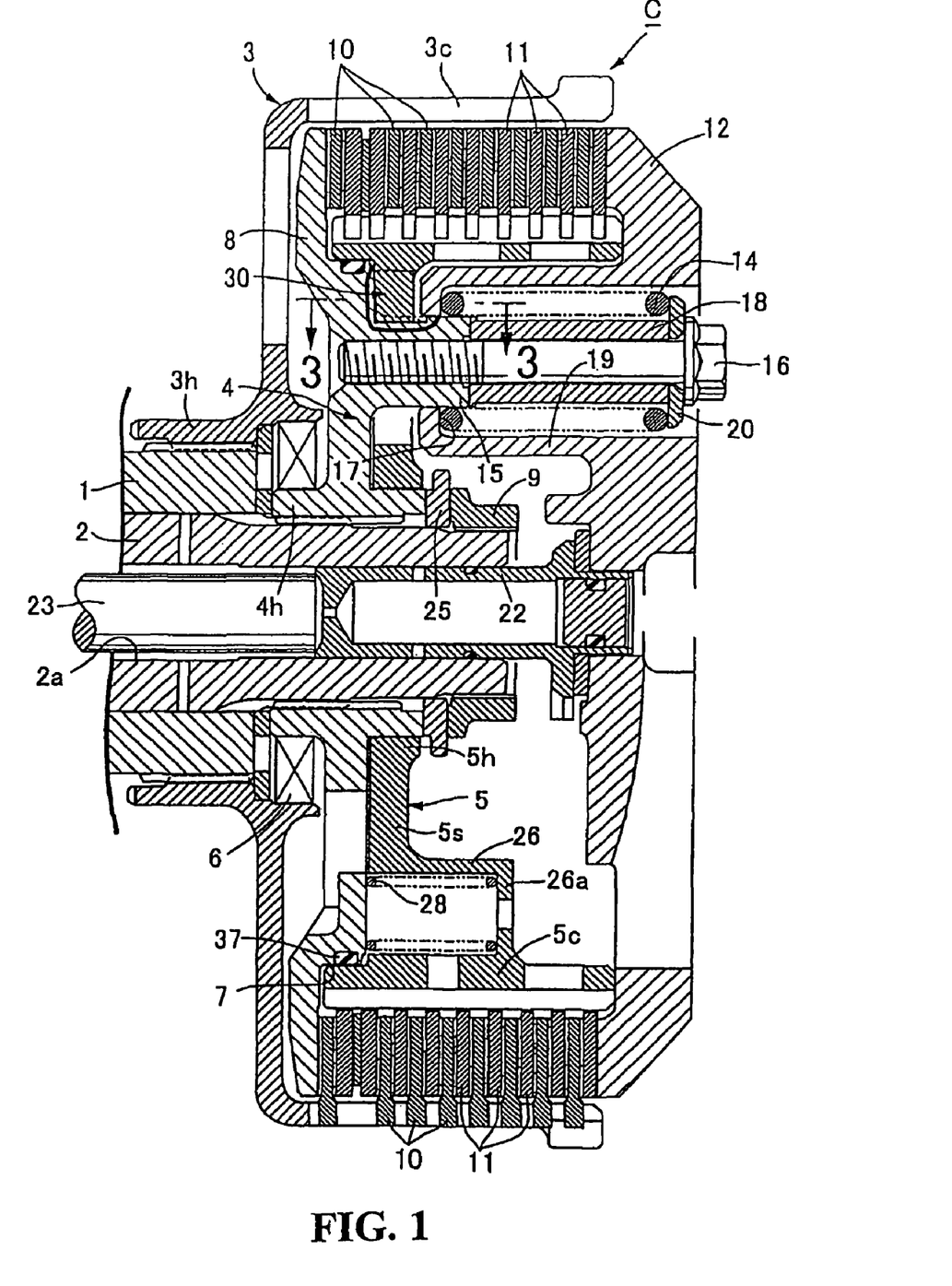
FIG. 1 is a vertical cross-sectional view showing a motorcycle clutch of an embodiment of the present invention when there is no load.

First, in FIG. 1, a clutch C is a multidisc type the clutch constructed for a motorcycle and includes a cylindrical clutch outer 3 with a bottom, and a clutch inner 4 and a clutch center 5 arranged within the clutch outer 3. An input shaft 1 coupling with a crankshaft of an engine (not shown) is spline-engaged to a hub 3h formed at a central section of an end wall of the clutch outer 3. An output shaft 2 passing through a hollow section of the input shaft 1 is spline-engaged at the hub 4h of the clutch inner 4 and is fixed using a nut 9. An oil seal 6 is provided between the hubs 3h, 4h.

A disc-shaped pressed plate 8 broadening in a radial direction is formed integrally at the clutch inner 4 via an annular stepped section 7. The pressed plate 8 is arranged next to an end wall of the clutch outer 3. The clutch center 5 is supported in such a manner that the hub 5h at a central part is freely rotatable at an outer peripheral surface of the hub 4h of the clutch inner 4 and is freely slidable in an axial direction. The clutch center 5 has the integral cylindrical portion 5c arranged concentrically within a cylindrical portion 3c of the clutch outer 3, with a plurality of first and second friction plates 10, 11 interposed alternately between the cylindrical portions 3c, 5c. During this time, the first friction plate 10 spline-engages with the cylindrical portion 3c of the clutch outer 3 so as to be freely slidable in an axial direction, and the second friction plate 11 spline-engages with the cylindrical portion 5c of the clutch center 5 in a freely slidable manner.

The pressed plate 8 is disposed to contact one side of a group of the first and second friction plates 10, 11. A pressing plate 12 that is retractable with respect to the other side of the group of first and second friction plates 10, 11 is coupled to the clutch inner 4. The plurality of clutch springs 14 urged at a prescribed set load by the pressing plate 12 to the side of the pressed plate 8 are provided compressed between the pressing plate 12 and the clutch inner 4. This structure is now described in detail.

Figure 5:
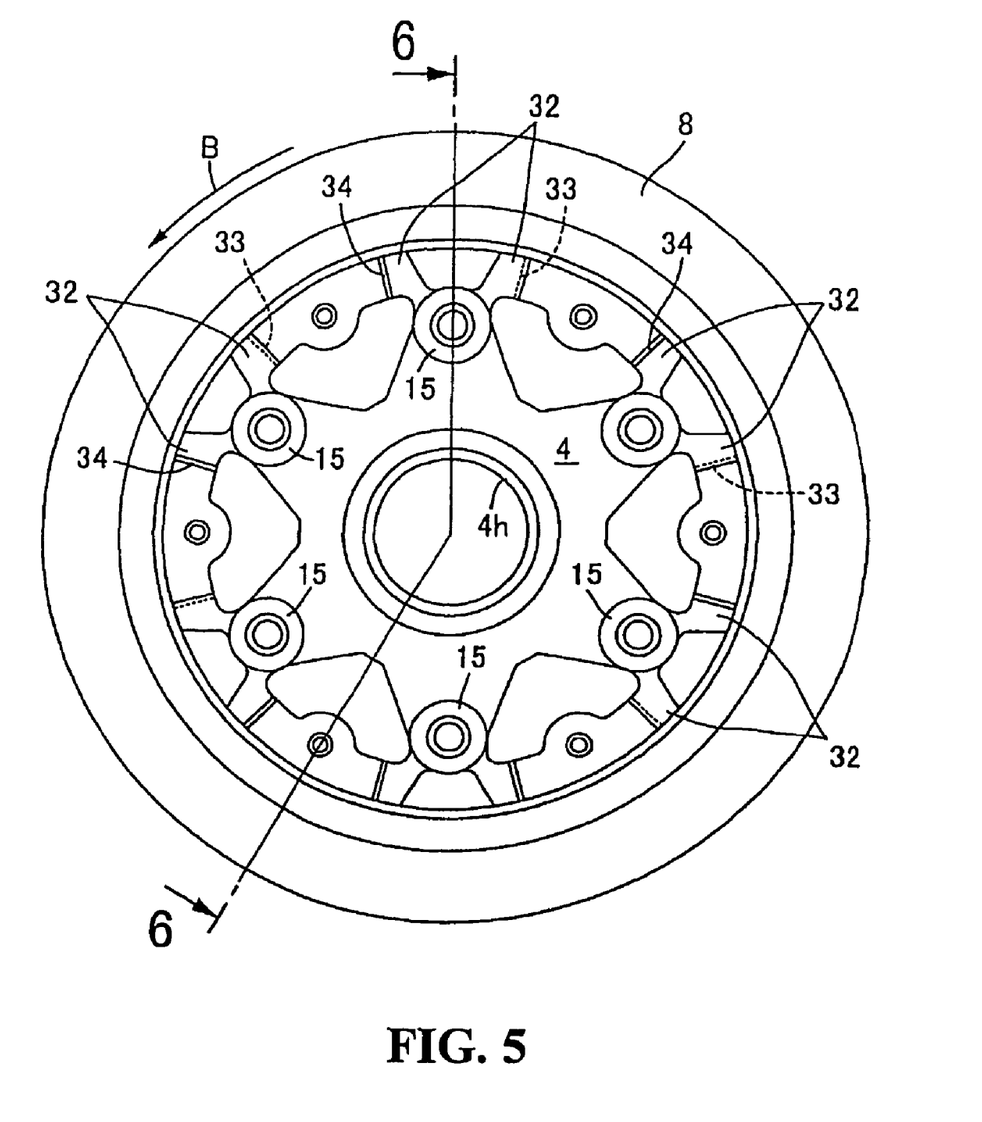
FIG. 5 is a front view of the clutch inner in FIG. 1.
Figure 6:
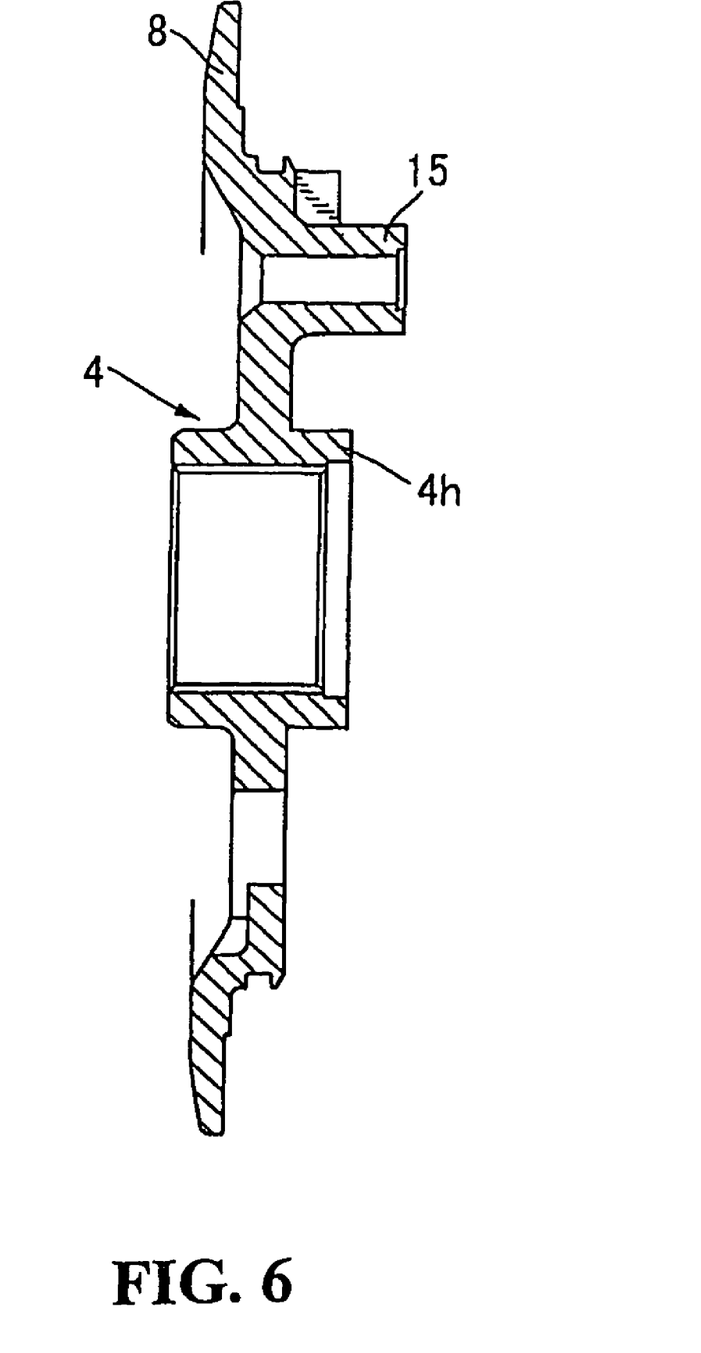
FIG. 6 is a cross-sectional view along the line 6-6 of FIG. 5.

At the clutch inner 4, as shown in FIG. 1, FIG. 5, and FIG. 6, the clutch center 5 is integrally provided with a plurality of bosses 15 in a circumferential direction that are equidistantly spaced, the bosses 15 each having a partially threaded through hole in an axial direction. Support shafts 16 constituted by bolts are then disposed at the bosses 15, with a first spring seat 17 formed at the end of each support shaft 16. Each first spring seat 17 is fixed so as to be sandwiched by a distance collar 18 fitting at the outer periphery of the support shafts 16 and a head section of the support shafts 16.

On the other hand, as shown in FIG. 1, a plurality of spring holding tubes 19 encompassing individual support shafts 16 are formed integrally in the pressing plate 12. A second spring seat 20 is integrally formed at the end of each spring holding tube 19 close to the clutch inner 4, with the clutch springs 14 being installed in a compressed state between the first and second spring seats 17, 20. The clutch springs 14 is then housed within the spring holding tubes 19. The pressing plate 12 puts the clutch C into an engaged state by sandwiching the first and second friction plates 10, 11 using the spring force of the clutch springs 14 in cooperation with the pressed plate 8.

Returning to FIG. 1, a release plunger 22 supported so as to be freely slidable and rotatable at a hollow section 2a of the output shaft 2 is coupled to a central section of the pressing plate 12. A clutch lever for a motorcycle (not shown) is coupled to the release plunger 22 via the release rod 23 disposed at the hollow section 2a. If the release plunger 22 is pressed via the release rod 23 as a result of the action of the clutch lever, the pressing plate 12 resists the urging force of the clutch springs 14 so as to retract from the group of the first and second friction plates 10, 11 so that the clutch C can be disengaged.

Figure 7:
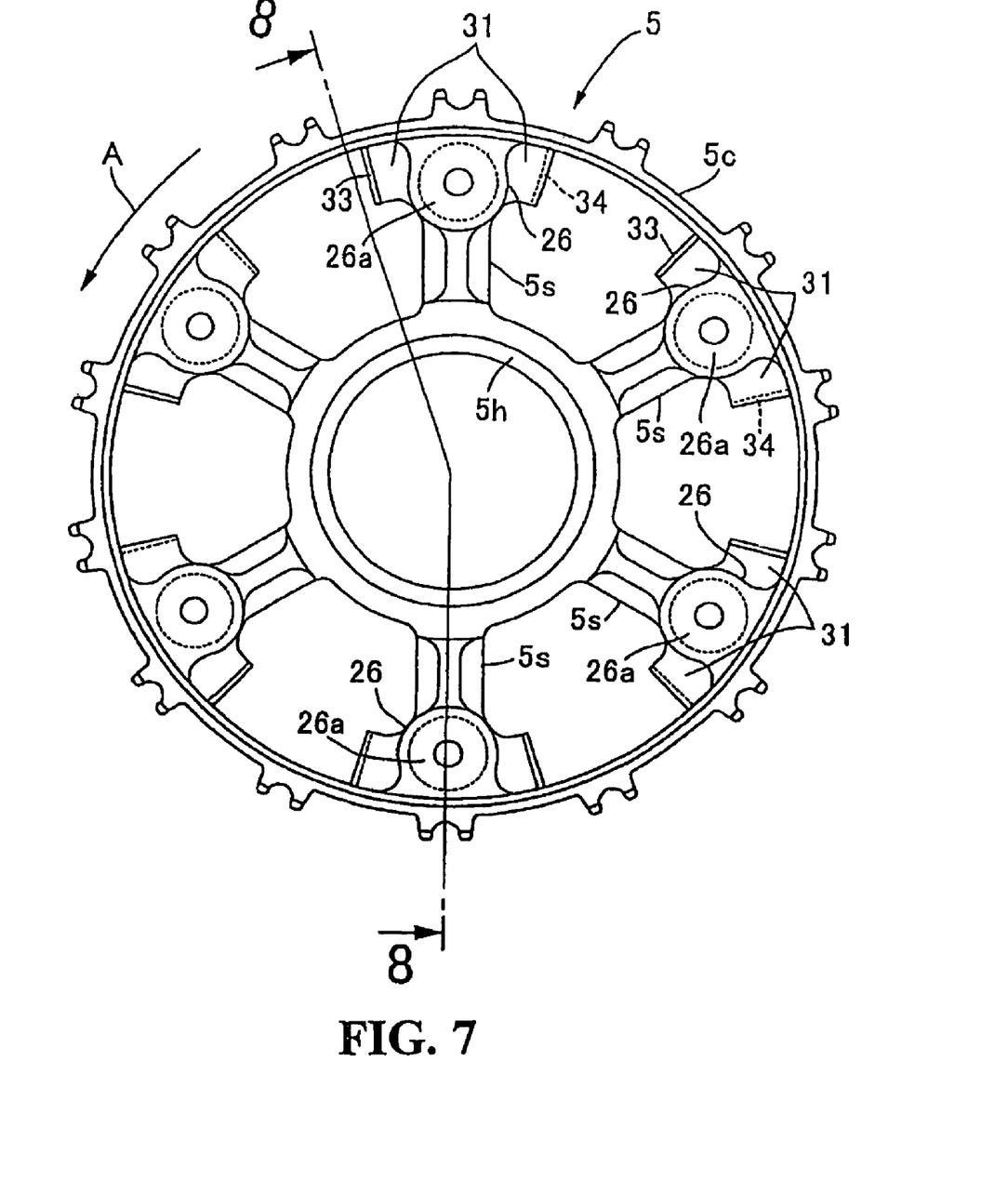
FIG. 7 is a front view of the clutch center in FIG. 1.
Figure 8:
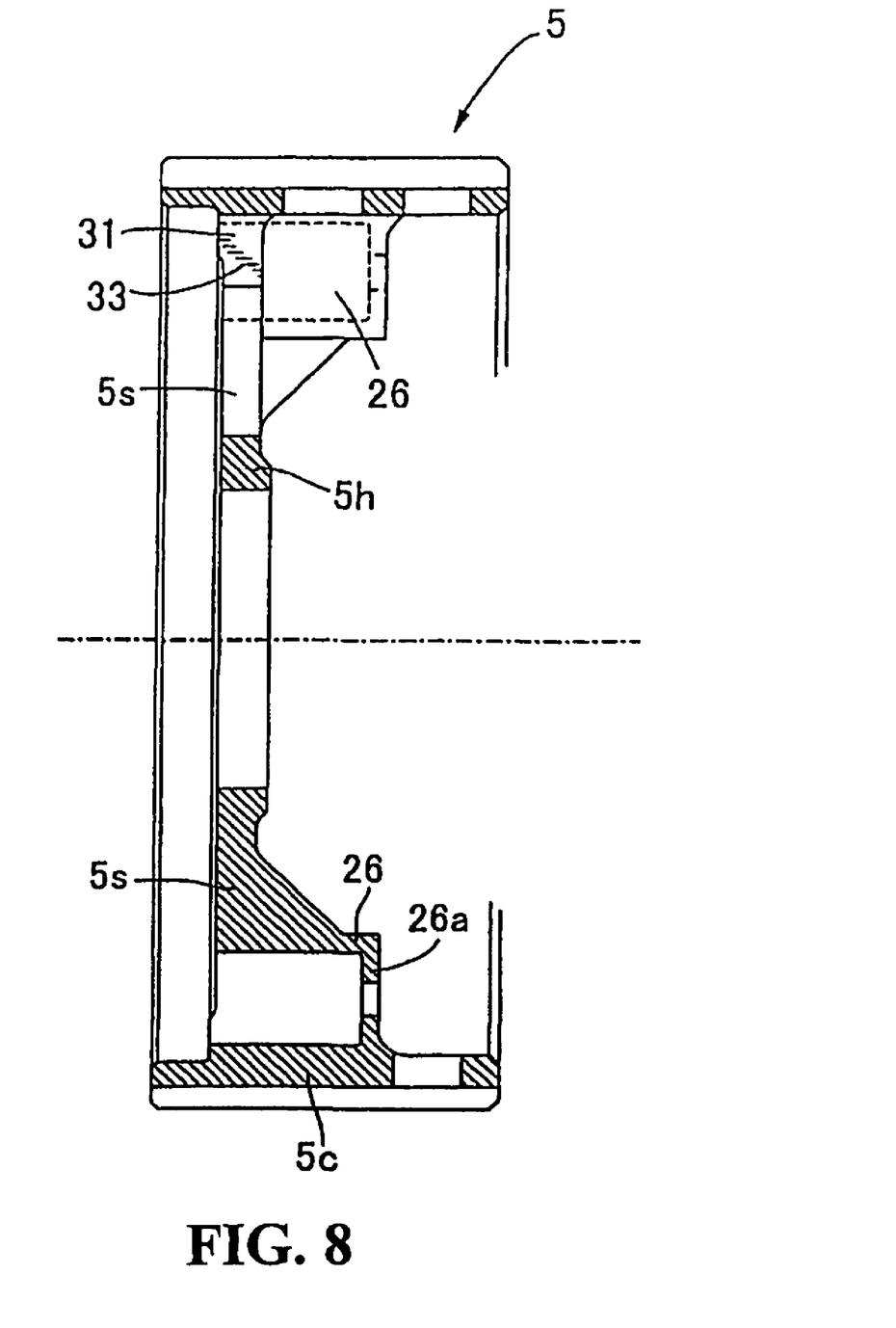
FIG. 8 is a cross-sectional view along line 8-8 of FIG. 7.

As shown in FIGS. 1, 7, and 8, the clutch center 5 is capable of rotating on the hub 4h of the clutch inner 4 and is capable of sliding in an axial direction. However, the sliding in this axial direction is limited to being between a first position P1 (refer to FIG. 3) abutting with an inner surface of the clutch inner 4, and a second position P2 (refer to FIG. 2 and FIG. 4) sandwiched by the hub 4h of the clutch inner 4 and the nut 9 on the output shaft 2 and abutting with the fixed stopper 25. The cylindrical portion 5c then abuts with the inside surface of the pressing plate 12 immediately upon the clutch center 5 starting to move from the first position P1 to the side of the second position P2.

As shown in FIGS. 2, 3, 7 and 8, the clutch center 5 is provided with a plurality of spring accommodating tubes 26 formed on the inner peripheral wall of the cylindrical portion 5a integrally therewith so as to be equidistantly spaced, the spring accommodating tubes 26 each having a cylindrical shape with a bottom. At the clutch center 5, the spring accommodating tubes 26 and the hub 5h are integrally coupled by a plurality of spokes 5s. The cylindrical portion 5c, the spring accommodating tubes 26, the spokes 5s and the hub 5h reinforce each other to give a strong, lightweight, clutch center 5.

Each spring accommodating tube 26 is arranged in parallel with the axis of the clutch center 5, and has a bottom wall 26a at an end on the side of the pressing plate 12, with the other end being open towards the clutch inner 4. Auxiliary springs 28 are then provided in a compressed state between the bottom wall 26a and the clutch inner 4. The auxiliary springs 28 are housed within the spring accommodating tubes 26. Spring forces of the auxiliary springs 28 urge the cylindrical portion 5c of the clutch center 5 to abut with the inside surface of the pressing plate 12 and urge the pressing plate 12 in a direction of disengaging the clutch, i.e. in a direction opposing the spring force of the clutch springs 14. However, the total spring load for the plurality of auxiliary springs 28 can be set to be smaller than the total spring load of the plurality of clutch springs 14.

A cam mechanism 30 is provided between the clutch inner 4 and the clutch center 5. When positive torque A (refer to FIG. 3) acts from the clutch center 5 to the clutch inner 4, the cam mechanism 30 generates a pulling force that causes the clutch center 5 to resist the urging force of the auxiliary spring 28 so as to move to the first position P1. When a reverse torque B (refer to FIG. 4) acts from the clutch inner 4 to the clutch center 5, the cam mechanism 30 generates a pushing thrust that causes the clutch center 5 to move to the second position P2.

Specifically, the cam mechanism 30 includes a plurality of first cams 31 formed spaced equidistantly in a circumferential direction at the clutch center 5 and a plurality of second cams 32 formed the clutch inner 4 so as to engage with the first cams 31. First engaging surfaces 33 to a forward side in the direction of positive torque A and second engaging surfaces 34 to a rear side of the first cams 31 and the second cams 32 are inclined at fixed angles α and β with respect to a radial plane 35 including a rotating axis of the clutch C. At the first engaging surfaces 33, when the positive torque A acts from the clutch center 5 towards the clutch inner 4, both of the cams 31, 32 slide so that a pulling force F1 causing the clutch center 5 to resist the urging forces of the auxiliary springs 28 and move to the first position P1 is generated (refer to FIG. 3). When a reverse torque B then acts from the clutch inner 4 to the clutch center 5, at the second engaging surfaces 34, both cams 31, 32 slide so as to generate a pushing thrust F2 causing the clutch center 5 to move to the second position P2 (refer to FIG. 4). The angles α, β can then be set to correspond to the magnitudes desired for the pulling force F1 and the pushing thrust F2.

Figure 3:
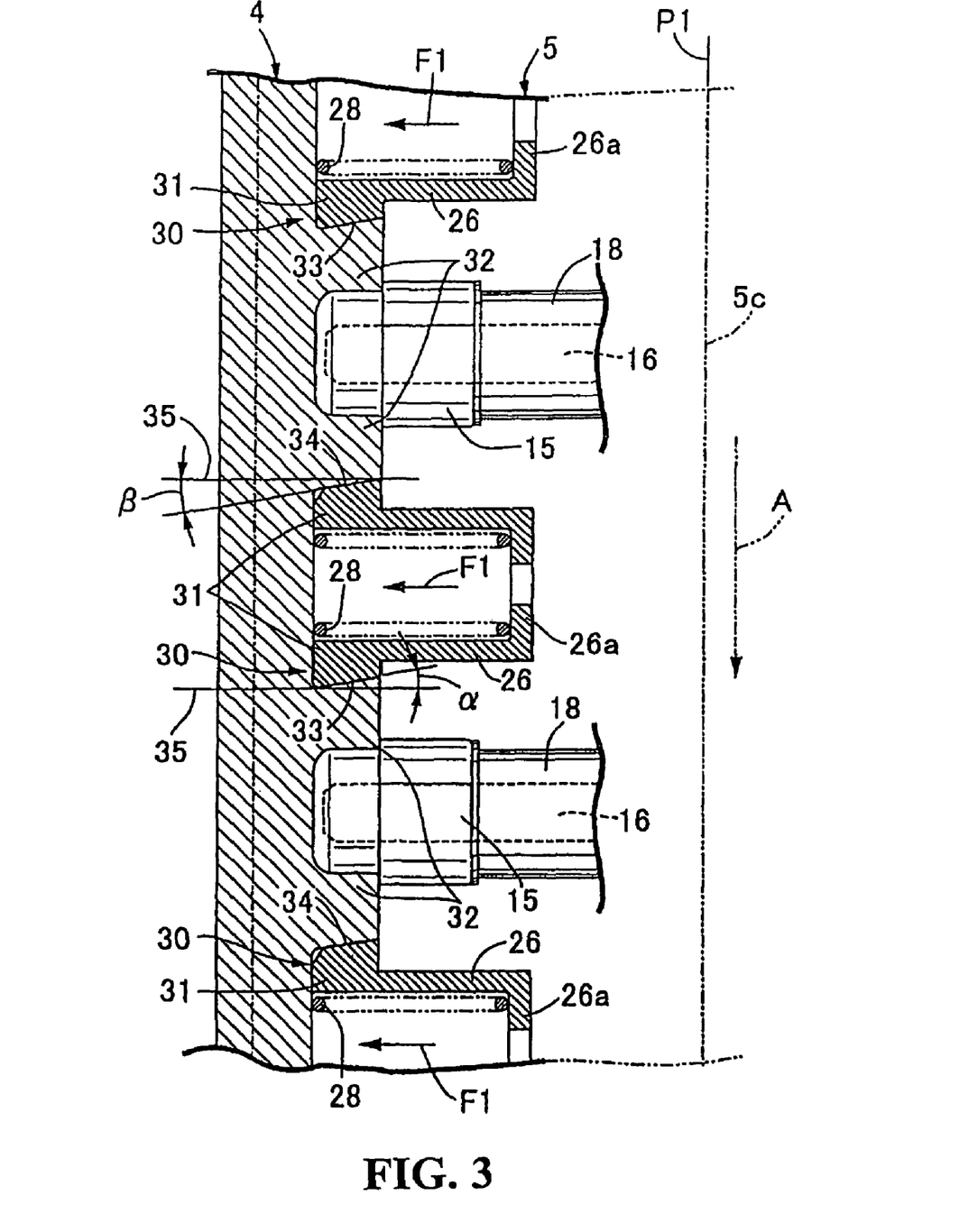
FIG. 3 shows the state of the cam mechanism when a positive torque acts taken along the cross-sectional line 3-3 of FIG. 1.
Figure 4:
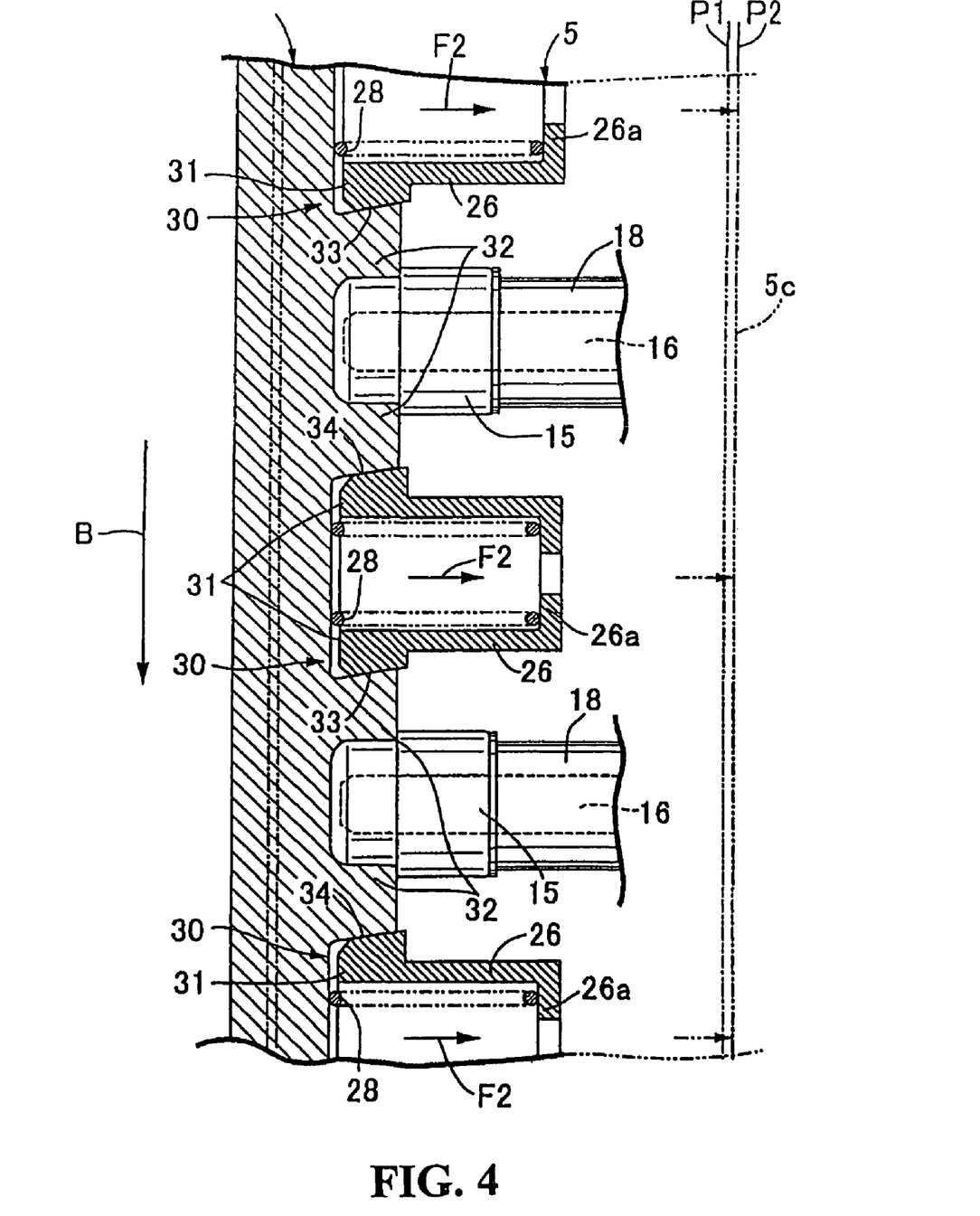
FIG. 4 shows the state of the cam mechanism at the time of reverse torque and is a view corresponding to FIG. 3.

At the cam mechanism 30, the first cams 31 are provided at both sides along the direction of rotation of the clutch center 5 of the spring accommodating tubes 26. The first cams 31 and the spring accommodating tubes 26 therefore reinforce each other and further strengthening of the clutch center 5 can be achieved.

The second cams 32 are arranged to the outside of the boss 15 in a radial direction. The second cams 32 and the bosses 15 reinforce each other. It is therefore possible to obtain a strong, lightweight clutch inner 4.

Returning to FIG. 1, the cylindrical portion 5c of the clutch center 5 can be fitted so as to freely rotate and slide at the annular stepped section 7 of the clutch inner 4. During this time, an O-ring 37 fitted at an outer peripheral groove of the annular stepped section 7 makes contact with the inner peripheral surface of the clutch center 5. Vibration between the clutch center 5 and the clutch inner 4 is then absorbed by frictional resistance of the O-ring 37.

Next, a description is given of the operation of this embodiment.

When there is no load on the clutch C, as shown in FIG. 1, at the clutch center 5, the cylindrical portion 5c is made to make contact with the inside surface of the pressing plate 12 as a result of the urging force of the auxiliary springs 28. However, the pressing plate 12 is applied with spring loads of the clutch springs 14 towards the side of the pressed plate 8, i.e., the direction in which the clutch is connected, and also spring loads of the auxiliary springs 28 towards the side opposite to the pressed plate 8, i.e., the direction in which the clutch is disconnected. However, a total spring load for the auxiliary springs 28 can be set to be smaller than the total load for the clutch springs 14. The pressing plate 12 is therefore urged in a direction engaging the clutch by the difference of both spring loads. This means that when the vehicle is traveling, or when the transmission is being switched over from a neutral position to a low position, a clutch lever is operated in order to disengage the clutch C, and it is sufficient to provide a pressing force that overcomes the difference in spring load that is smaller than the spring load of the clutch springs 14 in order to push the pressing plate 12 in a direction of disengaging the clutch via the release rod 23 and the release plunger 22. The operation of disengaging the clutch can therefore be carried out more lightly. When the pressing plate 12 is moved sufficiently in the direction of disengaging the clutch, frictional force between the first and second friction plates 10, 11 substantially disappears and the clutch C is disengaged.

After this, in order to start smoothly, when half-clutch control is carried out for the clutch C using the clutch lever, friction is generated smoothly between the first and second friction plates 10, 11 and positive torque A of the clutch center 5 is transmitted to the clutch inner 4 via the cam mechanism 30. At this time, as shown in FIG. 3, at the cam mechanism 30, the first cams 31 integral with the clutch center 5 and the second cams 32 integral with the clutch inner 4 mutually slide so as to generate a pulling force F1 at the first engaging surfaces 33. In order to pull the clutch center 5 to the side of the clutch inner 4, the clutch center 5 resists the spring load of the auxiliary springs 28 so as to distance the cylindrical portion 5c from the inner surface of the pressing plate 12. As a result, the spring load of the auxiliary springs 28 no longer acts on the pressing plate 12, but rather only the spring load of the clutch springs 14 acts on the pressing plate 12 and the clutch lever. The pulling force F1 of the cam mechanism 30 and the friction accompanying the operation of the cam mechanism 30 therefore do not act on the pressing plate 12 at all. It is therefore possible to make slight half-clutch control straightforward as with a typical clutch of the related art.

When the clutch C is engaged, force transmitted from the input shaft 1 to the clutch outer 3 is transmitted to the clutch center 5 via the first and second friction plates 10, 11 coupled by friction. The force is then transmitted to the clutch inner 4 via the cam mechanism 30 and is subsequently transmitted to the output shaft 2.

When the vehicle is running under a normal load, when the load is increased so that a slip occurs between the first and second friction plates 10, 11, as with the time of a half-clutch operation described above, at the cam mechanism 30, the first cams 31 and the second cams 32 slide with respect to each other so as to generate the pulling force F1 at the first engaging surfaces 33. Because the clutch center 5 is pulled towards the clutch inner 4, the clutch center 5 resists the spring load of the auxiliary springs 28 and the cylindrical portion 5c is distanced from the inner surface of the pressing plate 12. As a result, the pressing plate 12 is not applied with the spring loads of the auxiliary springs 28 and then is applied with only the spring loads of the clutch springs 14. The spring load applied to the pressing plate 12, in the direction in which the clutch is connected, is therefore increased by the portion of the spring load of the auxiliary springs 28 that no longer acts on the pressing plate 12. The clutch capacity therefore increases and the clutch C can be made capable of transmission at high torque.

Figure 2:
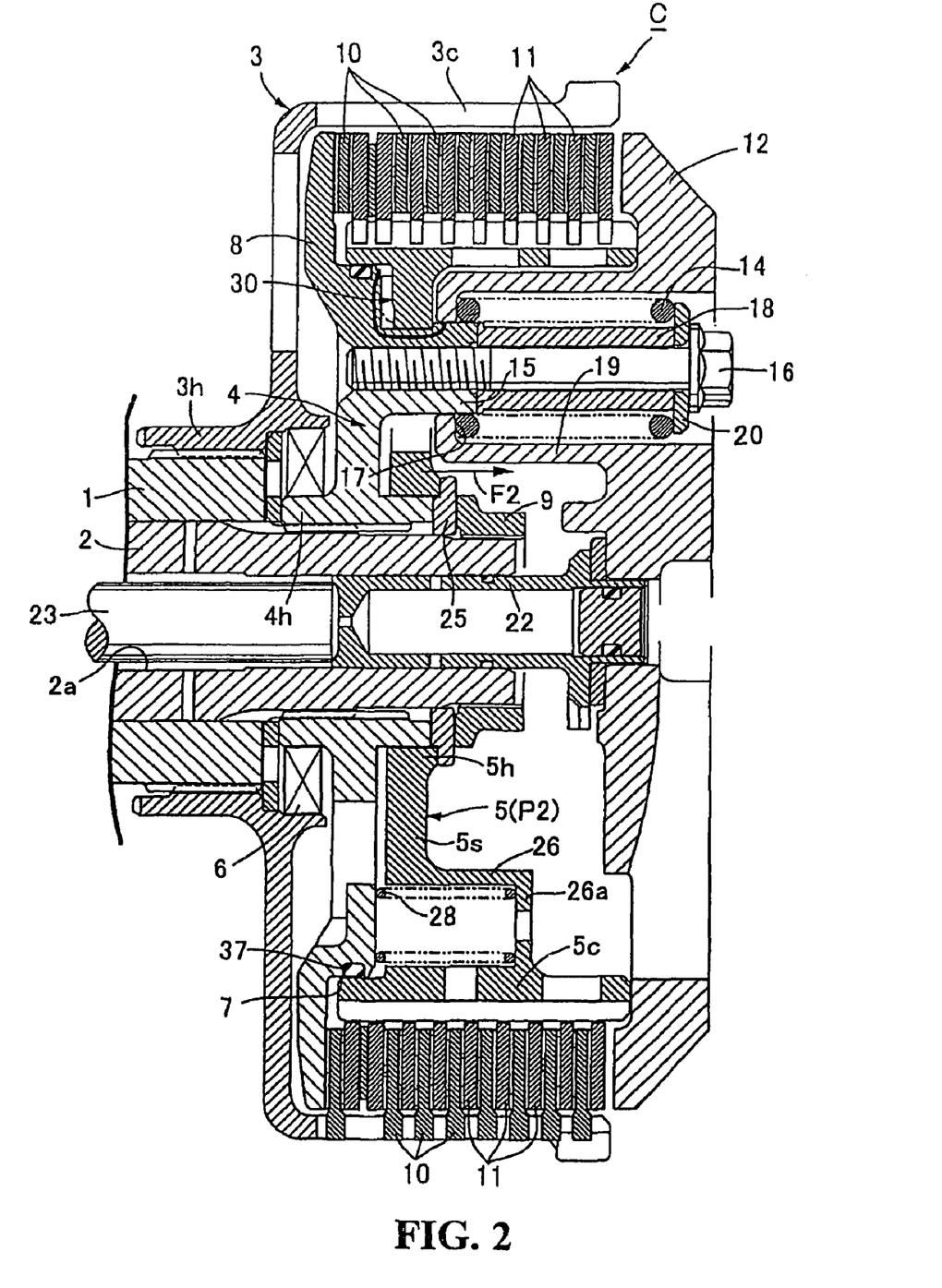
FIG. 2 is a vertical cross-sectional view showing the same clutch when a reverse torque acts.

A reverse torque B is transmitted from the output shaft 2 to the input shaft 1 via the clutch C when engine braking is applied to the vehicle. When this reverse torque B becomes a prescribed value or more, so that sliding occurs between the first and second friction plates 10, 11, as shown in FIGS. 2 and 4, at the cam mechanism 30, the second cams 32 and the first cams 31 slide with respect to each other so as to generate a pushing thrust F2 at the second engaging surfaces 34. This thrust pushing outwards is then directed from the cylindrical portion 5c of the clutch center 5 towards the pressing plate 12 in a clutch disengaging direction. The spring force of the clutch springs 14 acting on the pressing plate 12 is then reduced by the pushing thrust and the clutch capacity is therefore reduced. An appropriate amount of sliding therefore occurs between the first and second friction plates 10, 11 and it is possible to suppress the transmission of reverse torque B of greater than a prescribed value from the output shaft 2 to the side of the input shaft 1. The clutch center 5 abuts with the pressing plate 12 at times other than when the positive torque A acts, as a result of the spring load of the auxiliary springs 28. It is therefore possible to reduce kickback to the side of the clutch lever during engine braking.

A preferred embodiment of the present invention is described above but the present invention is by no means limited to the above embodiment and various design modifications can be carried out within the range that does not deviate from the essential gist of the present invention.

We claim:

1. A vehicle clutch comprising:
   a clutch outer member engaged with an input member;
   a clutch inner member disposed inside of said clutch outer member and engaged with an output member;
   a clutch center member movable in an axial direction of said vehicle clutch between a first position and a second position;
   a cam mechanism provided between said clutch inner member and said clutch outer member;
   a first friction plate spline-engaged with said clutch outer member so as to be moveable in the axial direction;
   a second friction plate overlaid on said first friction plate and spline-engaged with said clutch center member so as to be moveable with said clutch center member;
   a pressed plate coupled to the clutch inner member so as to face one side surface of said first and second friction plates;
   a pressing plate movable in the axial direction, wherein said first and second friction plates are sandwiched between said pressing plate and said pressed plate;
   a plurality of clutch springs urging the pressing plate to a side of said pressed plate;
   a plurality of clutch actuating members resisting an urging force of said clutch springs and causing said pressing plate to move to an opposite side of said pressed plate, wherein
   the clutch center member is movable between said first position, where said clutch center member is spaced from the pressing plate and is in contact with said clutch inner member, and
   said second position, where said clutch center member pushes said pressing plate to move to a side opposing said pressed plate,
   the clutch center member is applied with spring loads of auxiliary springs toward the side of said second position, the spring loads being smaller than the spring loads of said clutch springs, and
   said cam mechanism generates an axial pulling force for moving said clutch center member to the first position when a positive torque acts on said clutch inner member from said clutch center member.

2. The vehicle clutch according to claim 1, wherein said cam mechanism generates a pushing thrust that causes said clutch center member to move to the second position when a reverse torque acts from said clutch inner member to said clutch center.

3. The vehicle clutch according to claim 1, further comprising:
   a plurality of bosses that support support shafts that pass through the pressing plate in the axial direction, said plurality of bosses are equally spaced circumferentially around the axis, when viewed from the axial direction, wherein each of said plurality of clutch springs is compressed between the ends of each of said support shafts and said pressing plate, and
   said cam mechanism having a plurality of first cams and a plurality of second cams disposed at said clutch inner member so as to engage with said first cams, wherein
   said plurality of first cams are equally spaced circumferentially around the axis, when viewed from the axial direction, and
   said plurality of second cams are provided in a coupled manner on the outsides of said bosses, and when viewed from the axial direction, said plurality of second cams are positioned radially around the axis.

4. The vehicle clutch according to claim 1, wherein said clutch center member comprises a cylindrical portion to which said second friction plates are slidably spline-engaged, a hub supported at a hub portion of said clutch inner member so as to be freely rotatable and slidable, and a plurality of spokes coupling said hub to said cylindrical portion,
   a plurality of cylindrical spring accommodating tubes with bottoms, and with openings facing the clutch inner member, are formed at sections coupling the cylindrical portion and the spokes, said plurality of auxiliary springs providing a spring force toward the axial direction to separate said clutch center member from said clutch inner member are housed in the spring accommodating tubes between the bottom walls and said clutch inner member, said cam mechanism comprises a plurality of first cams disposed at both sides of said spring accommodating tubes along the direction of rotation of said clutch center member, and a plurality of second cams disposed at said clutch inner member so as to engage with the first cams, and said plurality of first cams are equally spaced circumferentially around the axis, when viewed from the axial direction.

* * * * *